UNITED STATES PATENT OFFICE.

KARL P. McELROY, OF WASHINGTON, DISTRICT OF COLUMBIA, ASSIGNOR TO CHEMICAL DEVELOPMENT COMPANY, A CORPORATION OF MAINE.

HYGROSCOPIC COMPOSITION.

1,268,135.  Specification of Letters Patent.  Patented June 4, 1918.

No Drawing.  Application filed July 19, 1917. Serial No. 181,639.

*To all whom it may concern:*

Be it known that I, KARL P. MCELROY, a citizen of the United States, residing at Washington, in the District of Columbia, have invented certain new and useful Improvements in Hygroscopic Compositions, of which the following is a specification.

This invention relates to hygroscopic compositions; and it comprises a mixture containing a glycol and a solid nonvolatile material of more or less hygroscopic properties, such material being advantageously a carbohydrate, or mixture of carbohydrates such as levulose, invert sugar, glucose, dextrin, etc., all as more fully hereinafter set forth and as claimed.

Glycerin is used for a variety of purposes and in many arts, and for the most part its use is based on its hygroscopic nature. It is a substantially nonvolatile liquid at ordinary temperatures and in admixture with water it lowers the vapor tension of the water. In a strong glycerin solution, the vapor tension of the water may be less than the partial pressure of water vapor in the air, and such a solution will take up water from the air till tension and partial pressure balance. Glycerin is therefore used for keeping moist all sorts of materials from stamp pads and printers' rollers to jams and jellies. Much is used in connection with snuff and tobacco. Being a non-irritating bland liquid of pleasant sweetish taste, it is used as a vehicle for medical purposes.

Glycerin, however, is a relatively expensive material and moreover is not altogether satisfactory for many purposes; and it is the object of the present invention to provide another material of greater hygroscopic value and of less expense. To this end, I use one or more of the bodies known as glycols. While the glycols hitherto have not been commercially known, I have found that they can be cheaply and readily prepared from petroleum by certain processes described and claimed in certain pending applications. In one such method (Serial No. 757,582) petroleum oils are gasified to make gas containing the gaseous olefins (ethylene, propylene and the butylenes), these olefins converted into the corresponding chlorids and the chlorids broken up to give glycols. In another such method (Serial No. 35,505,) the olefins are converted into chlorhydrins and these may be converted into glycols. In either method, the product from the oil gas is a mixture of glycols, ethylene glycol, propylene glycol and butylene glycols. For many purposes these mixed glycols are rather better than the individual glycols.

These glycols have rather peculiar properties. In and of themselves they are not very volatile while they are rather more hygroscopic than glycerin; that is, a drop of glycol will take up more moisture from the air than a drop of glycerin. Also they are more viscous; which in itself is a valuable property. But the behavior of a glycol-water solution is peculiar in that as water accumulates by absorption from the air apparently the vapor tension of the mixture (not of the water alone) increased with the final result that the mixture as a whole may finally evaporate.

I have found that this tendency toward evaporation may be corrected while retaining the valuable hygroscopic properties of the glycol by the simple expedient of dissolving a water soluble body in the glycol-water mixture. It is desirable and advantageous to have this third body in itself of hygroscopic nature though many of the benefits of this invention can be attained with things which, like cane sugar, are in and of themselves nonhygroscopic or nondeliquescent. Cane sugar or sucrose as a matter of fact makes an excellent third body for the present purposes, giving a highly hygroscopic solution in a glycol-water mixture which is well adapted for food purposes, such as the manufacture of soft or sticky candies like gumdrops. As the glycol itself has food value, and is sweet, the mixture is excellent for this purpose. But for most commercial purposes I find it better to "invert" the sugar first with the aid of a little acid or in other well known ways. Invert sugar is a mixture of levulose and dextrose and is, because of the levulose, highly hygroscopic, so that invert sugar adds materially to the desirable qualities of the final material. Levulose itself, made from invert sugar, from dahlia bulbs, artichokes, etc., may be used with great advantage. Confectioner's glucose, containing dextrose, maltose, dextrins, malto-dextrins, etc., may be used as may each of these carbo-hydrate bodies severally. Dextrin in any of its commercial forms, such as British gum, may be employed. Milk sugar, or lactose, is particularly desirable for medicinal articles.

In such materials as jams and jellies, the sugar and water are already present and glycol may be added directly.

For most commercial purposes these carbohydrates are better than inorganic salts; but the latter may be used. Calcium chlorid is an excellent evaporation retarder for the present purposes, as is magnesium chlorid or zinc chlorid. Common salt (sodium chlorid) is useful but not to the same extent.

For many purposes, and particularly as an antiseptic or disinfecting composition, boric or boracic acid is a useful third body. Although boric acid is not deliquescent *per se*, and in fact is not particularly soluble in water, yet in a glycol water mixture the solubility is greater and hygroscopicity is considerably greater than that of the solvent alone so that the composition is quite stable against evaporation.

As the glycol I may use ethylene glycol, propylene glycols or the butylene glycols alone or the mixture resulting from the treatment of oil gas. This mixture which I may call oil gas glycols is particularly useful.

On heating the glycols alone or admixed with dehydrating agents such as zinc chlorid, what are known as polyglycols are formed. Polyglycols may also be formed by the action of olefin oxids on the glycols. In the case of oil gas glycols, several different glycols may unite to form polyglycols of mixed constitution. For some purposes the polyglycols, or mixtures of glycols and polyglycols, are better adapted than the glycols themselves, the polyglycols being higher boiling, less volatile and more viscid. They are, however, not ordinarily so hygroscopic. I regard these polyglycols and admixtures containing them, as well adapted for the present purpose. The use of a third body with polyglycols and water though not so useful in restraining volatility, since polyglycol solutions are not very volatile anyhow, is useful in heightening the hygroscopic effect.

What I claim is:

1. A hygroscopic composition comprising a glycol and a water soluble solid body.
2. A hygroscopic composition comprising oil gas glycols and an evaporation restrainer soluble therein.
3. A hygroscopic composition comprising a glycol and a water soluble carbohydrate.
4. A hygroscopic composition comprising oil gas glycols and a water soluble carbohydrate.
5. A hygroscopic composition comprising a glycol and a water soluble hygroscopic carbohydrate.
6. A hygroscopic composition comprising oil gas glycols and a water soluble hygroscopic carbohydrate.

In testimony whereof, I affix my signature.

K. P. McELROY.

Copies of this patent may be obtained for five cents each, by addressing the "Commissioner of Patents, Washington, D. C."